(12) United States Patent
Miyazaki

(10) Patent No.: US 8,885,847 B2
(45) Date of Patent: Nov. 11, 2014

(54) VEHICULAR APPARATUS

(75) Inventor: Tatsuya Miyazaki, Okazaki (JP)

(73) Assignee: Denso Corporation, Kariya (JP)

( * ) Notice: Subject to any disclaimer, the term of this patent is extended or adjusted under 35 U.S.C. 154(b) by 170 days.

(21) Appl. No.: 13/614,228

(22) Filed: Sep. 13, 2012

(65) Prior Publication Data

US 2013/0090932 A1 Apr. 11, 2013

(30) Foreign Application Priority Data

Oct. 7, 2011 (JP) ................................. 2011-222784

(51) Int. Cl.
| | | |
|---|---|---|
| *H04R 3/00* | (2006.01) | |
| *H04B 1/00* | (2006.01) | |
| *H04M 1/60* | (2006.01) | |
| *G10L 21/028* | (2013.01) | |

(52) U.S. Cl.
CPC ........... *G10L 21/028* (2013.01); *H04M 1/6091* (2013.01)
USPC ............................................. 381/92; 381/86

(58) Field of Classification Search
CPC .... H04R 2499/13; H04R 3/005; H04R 1/083; H04R 1/086; G10L 2021/02166; G10L 15/22; G10L 21/0208; G10L 2021/02165
USPC ...................................... 381/86, 92
See application file for complete search history.

(56) References Cited

U.S. PATENT DOCUMENTS

| | | | | |
|---|---|---|---|---|
| 5,625,697 | A | * | 4/1997 | Bowen et al. .................... 381/92 |
| 7,146,013 | B1 | * | 12/2006 | Saito et al. ...................... 381/92 |
| 2006/0222184 | A1 | * | 10/2006 | Buck et al. .................... 381/71.1 |
| 2006/0239471 | A1 | * | 10/2006 | Mao et al. ........................ 381/92 |
| 2009/0022330 | A1 | * | 1/2009 | Haulick et al. .................. 381/57 |
| 2009/0129620 | A1 | | 5/2009 | Tagawa et al. |
| 2010/0322436 | A1 | * | 12/2010 | Feng et al. ....................... 381/92 |
| 2011/0286604 | A1 | * | 11/2011 | Matsuo ........................ 381/71.1 |

FOREIGN PATENT DOCUMENTS

| | | |
|---|---|---|
| JP | 2001-359185 | 12/2001 |
| JP | 2003-114699 | 4/2003 |
| JP | 2005-184386 | 7/2005 |
| JP | 2006-279751 | 10/2006 |
| JP | 2007-302155 | 11/2007 |
| JP | 2007-329702 | 12/2007 |
| JP | 2008-236077 | 10/2008 |
| JP | 2010-283506 | 12/2010 |

* cited by examiner

*Primary Examiner* — Samuel G Neway

(74) *Attorney, Agent, or Firm* — Harness, Dickey & Pierce, PLC

(57) ABSTRACT

A hands-free conversation vehicular apparatus coupling with a communication terminal includes: a communication device; a sound output device; a sound input device inputting a transmission speech sound; a vehicle information acquisition device; a first sound extraction device setting a first direction for a directionality of the sound input device, and extracting a first sound along the first direction; a sound recognition device; a second sound extraction device specifying a second direction for the transmission speech sound recognized by the sound recognition device, and extracting a second sound along the second direction; a sound quality comparison unit comparing a sound quality of the first and second sounds; a changeover device for selecting one of the first and second sounds as the transmission speed sound; and a control device for allowing the changeover device to perform a changeover when a determination condition is fulfilled.

13 Claims, 11 Drawing Sheets

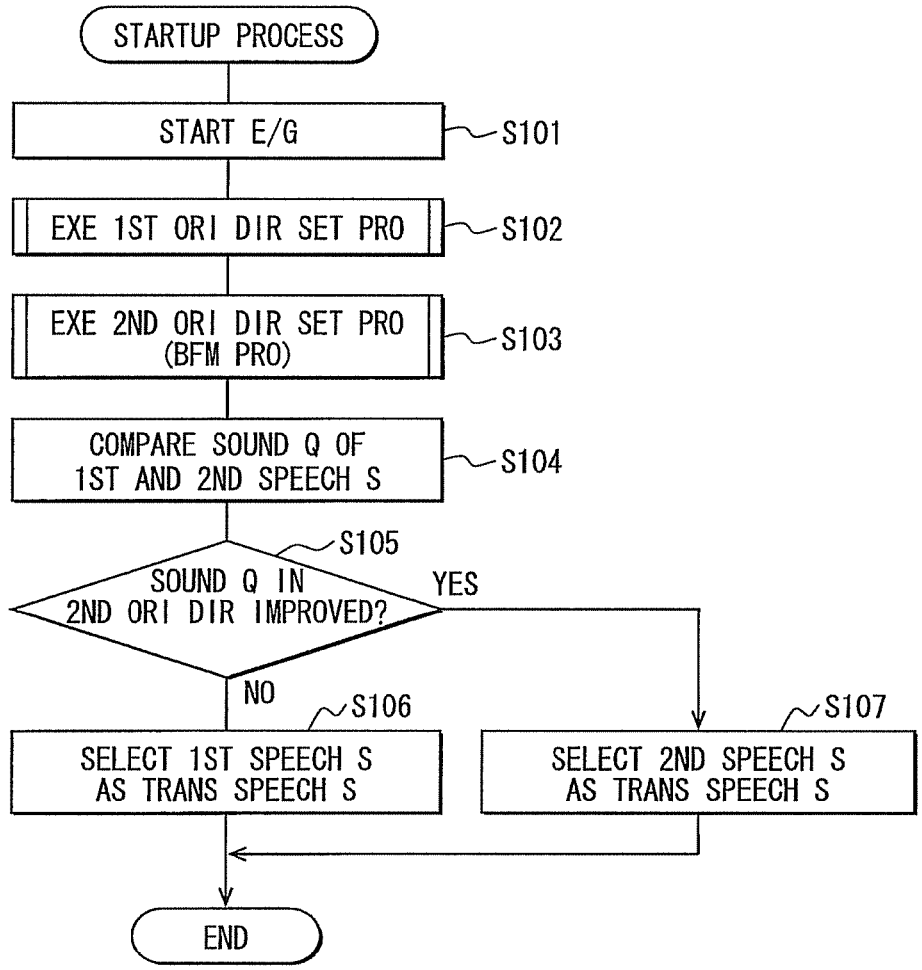

VEHICULAR APPARATUS

CROSS REFERENCE TO RELATED APPLICATION

This application is based on Japanese Patent Application No. 2011-222784 filed on Oct. 7, 2011, the disclosure of which is incorporated herein by reference.

TECHNICAL FIELD

The present disclosure relates to a vehicular apparatus having a hands-free conversation function for which a communication terminal connected to a public line network is used.

BACKGROUND

In recent years, there has been known a vehicular apparatus that is connected to a communication terminal connectable to a public line network and having a hands-free conversation function for carrying out a conversation using a microphone and a speaker, which are provided in a vehicle. In some of such vehicular apparatuses, with a view to inputting a speech sound of a talker appropriately and enhancing the quality of a conversation speech sound, the microphone serving as speech sound input means may be oriented to selectively input a speech sound from a specific orientational direction (directional direction) thereto. In this case, the orientational direction may be set by physically changing the position or orientation of the microphone itself. Also, as disclosed in Patent Documents 1 and 2, a plurality of microphones may be provided, and an orientational direction may be set by subjecting, to a signal process, speech sounds input to the respective microphones.

In setting the orientational direction as described above, it may be impossible to set the orientational direction appropriately because of, for example, the fact that the position of a microphone with respect to a talker differs depending among vehicles, the fact that a predetermined orientational direction is displaced from an appropriate direction due to the positions of seats or the body type of a talker, or the like. Further, even when the orientational direction is appropriately set at first, this orientational direction may become inappropriate under certain running conditions. Thus, it is conceivable to enhance the quality of a conversation speech sound by adopting the methods of the aforementioned Patent Documents 1 and 2 or the like, specifying the position of the talker, and making a changeover in speech sound as needed.

However, in the case of a hands-free conversation, a transmitted speech sound that is transmitted to a party on the other end of the line is transmitted to a destination of conversation after being subjected to successive signal processes. On the other hand, the process of specifying an optimal orientational direction is executed as a process different from the signal processes of the transmitted speech sound during transmission. That is, a changeover in speech sound means a changeover from a speech sound being subjected to a signal process to a speech sound being subjected to another signal process. If a changeover in speech sound is made under such circumstances, defects such as the instantaneous or intermittent interruption of a transmitted speech sound, the generation of abnormal sound, and the like may be caused. Further, while speech sound recognition is under way, a changeover in speech sound may cause defects such as a decrease in the rate of recognition and the like.

[Patent Document 1] Japanese Patent Application Publication No. 2003-114699
[Patent Document 2] Japanese Patent Application Publication No. 2007-302155

SUMMARY

It is an object of the present disclosure to provide a vehicular apparatus that reduces the possibility of the occurrence of defects during a changeover in speech sound, while enhancing the quality of a conversation speech sound by appropriately setting an orientational direction at the time of the inputting of a speech sound.

According to an aspect of the present disclosure, a vehicular apparatus having, a hands-free conversation function for coupling with a communication terminal, which is connectable to a public line network, the vehicular apparatus includes: a communication device for communicating with the communication terminal; a speech sound output device for outputting a received speech sound, which is received from the communication terminal via the communication device; a speech sound input device having a first microphone and a second microphone, for inputting a transmission speech sound that is to be transmitted to the communication terminal; a vehicle information acquisition device for acquiring vehicle information that relates to a vehicle, on which the speech sound input device is mounted; a first speech sound extraction device for setting a first orientational direction, which provides a directionality of the speech sound input device, according to the vehicle information acquired by the vehicle information acquisition device, and for extracting a first speech sound that is input from the first orientational direction; a speech sound recognition device for signal-processing the transmission speech sound input via the speech sound input device so as to recognize the transmission speech sound; a second speech sound extraction device for signal-processing the transmission speech sound input via the speech sound input device, for specifying a second orientational direction, which provides an input direction of the transmission speech sound recognized by the speech sound recognition device, based on a signal processing result with changing the directionality of the speech sound input device, and for extracting a second speech sound that is input from the second orientational direction; a sound quality comparison unit for comparing a sound quality of the first speech sound with a sound quality of the second speech sound; a changeover device for selecting one of the first speech sound and the second speech sound, which is higher in sound quality, according to a comparison result provided by the sound quality comparison unit, and for performing a changeover between the first speech sound and the second speech sound to select the one of the first speech sound and the second speech sound as the transmission speed sound; and a control device for allowing the changeover device to perform the changeover between the first speech sound and the second speech sound when a predetermined determination condition is fulfilled.

In the above apparatus, when a changeover is made between speech sounds that are subjected to different processes, for example, in the case where a hands-free conversation is under way, defects such as the interruption of a transmission speech sound transmitted to a party on the other end of the line, the generation of abnormal sound, and the like may be caused. Thus, the possibility of the occurrence of defects during a changeover in speech sound can be reduced by specifying a direction in which a speech sound that is higher in sound quality is input while changing the orientational direction, and controlling the changeover between the speech sounds on the basis of fulfillment of the determination condition. Besides, the speech sound to which the changeover is made is a speech sound determined as an optimal speech sound by the second speech sound extraction device, in other words, a speech sound that is higher in sound quality than the speech sound from which the changeover is made. Therefore, the quality of the speech sound of conversation can be enhanced as well.

BRIEF DESCRIPTION OF THE DRAWINGS

The above and other objects, features and advantages of the present disclosure will become more apparent from the following detailed description made with reference to the accompanying drawings. In the drawings:

FIG. 6 is a diagram showing a flow of a startup process;

DETAILED DESCRIPTION

Hereinafter, a vehicular apparatus according to one embodiment of the present disclosure will be described with reference to FIGS. 1 to 13.

Figure 1:
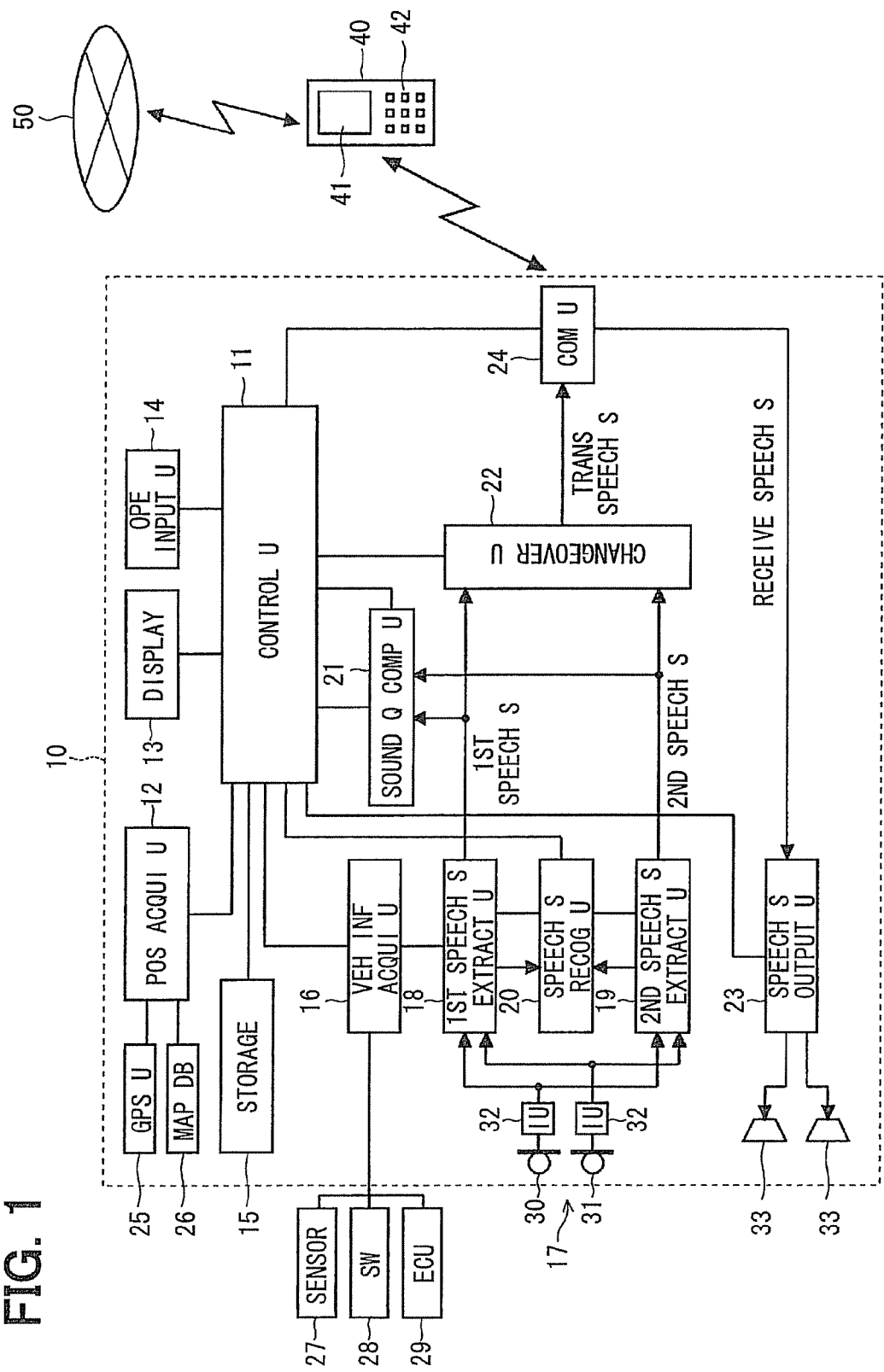
FIG. 1 is a diagram schematically showing a configuration of an in-vehicle machine according to an embodiment.

As shown in FIG. 1, an in-vehicle machine 10 as a vehicular apparatus is equipped with a control unit 11, a position acquisition unit 12, a display unit 13, an operation input unit 14, a storage unit 15, a vehicle information acquisition unit 16, a speech sound input unit 17, a first speech sound extraction unit 18, a second speech sound extraction unit 19, a speech sound recognition unit 20, a sound quality comparison unit 21, a changeover unit 22, a speech sound output unit 23, and a communication unit 24. Among these units, the first speech sound extraction unit 18, the second speech sound extraction unit 19, the speech sound recognition unit 20, the sound quality comparison unit 21, and the changeover unit 22 are realized as software by a computer program executed by the control unit 11. Note that the first speech sound extraction unit 18, the second speech sound extraction unit 19, the speech sound recognition unit 20, the sound quality comparison unit 21, and the changeover unit 22 may also be realized as hardware.

The control unit 11 of the in-vehicle machine 10 is constituted by a microcomputer having a CPU (not shown), a RAM (not shown), a ROM (not shown), an input/output interface (not shown), and the like. The control unit 11 controls the entire operation of the in-vehicle machine 10, such as communication operation, display operation, the execution of various processes as shown in FIGS. 6 to 11, which will be described later, and the like, according to a computer program stored in the ROM, the storage unit 15, or the like. The control unit 11 is equivalent to the control means.

The in-vehicle machine 10 in the present embodiment is configured to serve as a so-called car navigation system as well, and is equipped with a position acquisition unit 12 that acquires a position of the vehicle. The position acquisition unit 12 acquires a position of the vehicle on the basis of a positioning signal received by a well-known Global Positioning System (GPS) unit 25, which is a common satellite positioning system, and stores map data as a map database (DB) 26. The control unit 11 performs well-known navigation functions such as route guidance, map matching, and the like, on the basis of a position of the vehicle acquired from the position acquisition unit 12, a destination input from the operation input unit 14, the map data stored as the map DB 26, and the like. Note that the position acquisition unit 12 is also connected to various sensors that detect a state of the vehicle, such as a gyro sensor (not shown), a vehicle speed sensor (not shown), an acceleration sensor (not shown), and the like.

The display unit 13 is constituted by, for example, a liquid crystal display, an organic EL display, or the like, and displays various information in accordance with a command signal from the control unit 11. For example, the display unit 13 displays a navigation screen, an operation screen, or supplementary information shown in FIGS. 12 and 13, which will be described later, and the like. The operation input unit 14 is composed of various switches for inputting an operation by a user, such as a so-called touch panel-type switch provided on the screen of the display of the display unit 13, a push button-type pushdown button switch arranged around the display, and the like. Note that the operation input unit 14 may include a remote controller and the like.

The storage unit 15 is constituted by a readable/writable storage device, for example, an HDD or the like, and stores a computer program of the in-vehicle machine 10, a navigation program, various other programs, and the like. Further, the storage unit 15 also stores vehicle information and learning information, which will be described later. Note that the storage unit 15 may be configured to store the map DB 26. The storage unit 15 is equivalent to the storage means.

The vehicle information acquisition unit 16 is connected to sensors 27, switches 28, and ECUs 29. The sensors 27 detect, for example, positions, heights or angles of seats, a tilt angle of the speech sound input unit 17, installation states of other control devices, and the like. Further, a camera or the like as image pickup means for specifying the position of a talker may be provided as the sensors 27. The sensors 27 also include a vehicle speed sensor, an accelerator operation amount sensor, and the like. The switches 28 are composed of, for example, switches for opening/closing windows, an operation switch for audio equipment, and the like. The ECUs 29 are, for example, an air-conditioner ECU, an engine ECU, and the like. The ECUs 29 are various control devices that perform the control relating to the running of the vehicle. From these ECUs 29, the vehicle information acquisition unit 16 acquires, for example, a status of use of an air conditioner, information indicating an operation amount of an accelerator (not shown) or information indicating a rotational speed of an engine (not shown), and the like as vehicle information. The vehicle information acquisition unit 16 is equivalent to the vehicle information acquisition means.

The speech sound input unit 17 has a first microphone 30 and a second microphone 31, which are designed to input a speech sound of a talker. As will be described later, components other than the speech sound, such as noise and the like, are also input to the first microphone 30 and the second microphone 31. Note that the flow of the speech sound (and a speech sound signal subjected to a signal process) is indicated by arrows in FIG. 1. A speech sound such as a dialogue during a hands-free conversation or the like, a so-called speech sound command serving as an operation input for the in-vehicle machine 10, and the like are input to the speech sound input unit 17. Speech sounds input from the first microphone 30 and the second microphone 31 are input to the first speech sound extraction unit 18 and the second speech sound extraction unit 19, respectively, via input process units 32. That is, the speech sound input from the speech sound input unit is input from each of the microphones to the communication unit 24 during, for example, a hands-free conversation. Each of the input process units 32 is composed of an AD converter that converts a speech sound input into digital data, and functional units such as a low-pass filter, an echo canceller and the like.

The first speech sound extraction unit 18 and the second speech sound extraction unit 19 extract, from speech sounds input from the speech sound input unit 17, speech sounds input from specific orientational directions. Then, the first speech sound extraction unit 18 and the second speech sound extraction unit 19 output the extracted speech sounds as a first speech sound and a second speech sound, respectively. In the present embodiment, the first speech sound extraction unit 18 extracts, a speech sound input from a first orientational direction, which is an orientational direction set on the basis of vehicle information, in the early stages (during startup of the engine in the present embodiment, as will be described later). Further, the second speech sound extraction unit 19 specifies a second orientational direction, which is a direction in which a speech sound is input through speech sound recognition as will be described later, and extracts a speech sound input from the second orientational direction. The speech sound recognition unit 20 recognizes the speech sound input to the speech sound input unit 17. Note that the speech sound recognition unit 20 executes a speech sound recognition process in a general sense, which is designed to recognize the contents of instruction of the aforementioned speech sound command, and recognizes that an input sound is not noise or the like but a speech sound of a person.

The sound quality comparison unit 21 compares the sound quality of the first speech sound extracted by the first speech sound extraction unit 18 with the sound quality of the second speech sound extracted by the second speech sound extraction unit 19. The sound quality comparison unit 21 makes a comparison between sound qualities according to a so-called S/N ratio or the like, and also makes a comparison between sound volumes. Further, the sound quality comparison unit 21 also determines whether or not the sound qualities of the first speech sound and the second speech sound have exceeded a later-described sound quality reference value, and whether or not the sound volumes, of the first speech sound and the second speech sound have exceeded a later-described sound volume reference value. The sound quality comparison unit 21 is equivalent to the sound quality comparison means.

The changeover unit 22 makes a changeover between the first speech sound and the second speech sound, and selects one of the speech sounds as a transmitted speech sound that is transmitted to a party on the other end of the line during a hands-free conversation. The changeover unit 22 makes a changeover between the first speech sound and the second speech sound in accordance with a command signal from the control unit 11. At this time, although described, later in detail, the control unit 11 performs the control of allowing the changeover to be made when a predetermined determination condition is fulfilled. The changeover unit 22 is equivalent to the changeover means.

The speech sound output unit 23 is connected to a speaker 33. For example, the speech sound output unit 23 outputs a speech sound of route guidance as a navigation function, and outputs a received speech sound during a hands-free conversation. The speech sound output unit 23 is equivalent to the speech sound output means.

The communication unit 24 connects the in-vehicle machine 10 and a communication terminal 40 to each other according to, for example, a radio communication method such as Bluetooth (registered trademark) or a wired communication method such as a universal serial bus (USB). In this case, the communication unit 24 may be configured to be provided with only one of the radio communication method and the wired communication method, or may adopt a communication method other than the exemplified ones. The in-vehicle machine 10 communicates various kinds of data with the communication terminal 40 via the communication unit 24. The communication unit 24 is equivalent to the communication means.

The communication terminal 40 connected to the in-vehicle machine 10 is equipped with a terminal-side display unit 41, a terminal-side operation unit 42, and the like, and establishes communication with the in-vehicle machine 10 and with a public line network 50. The communication terminal 40 is, for example, a so-called cellular phone, a smart phone, a terminal for data communication, or the like, and has a function for carrying out a hands-free conversation with the in-vehicle machine 10.

Figure 2:
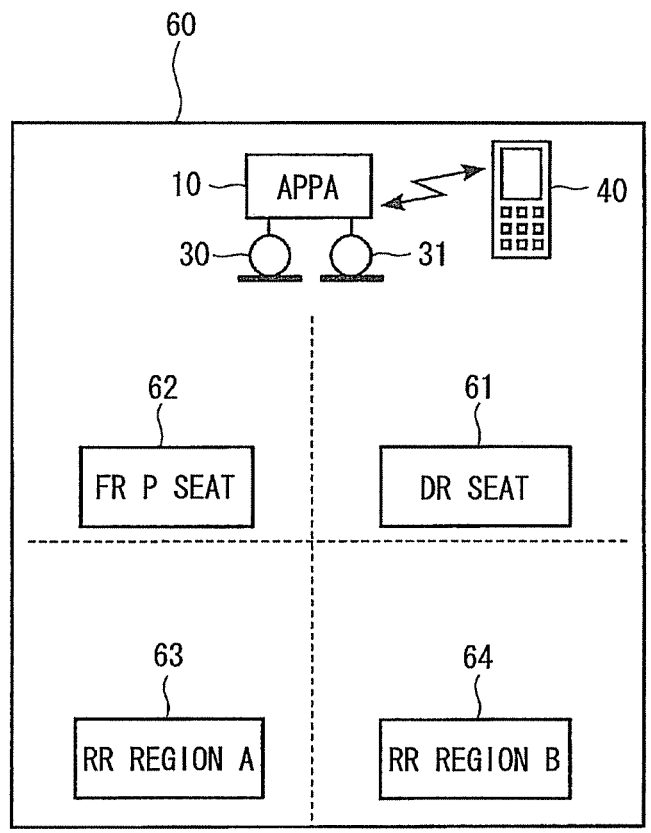
FIG. 2 is a diagram schematically showing an installation condition of the in-vehicle machine in a passenger compartment of a vehicle.

As shown in FIG. 2, the in-vehicle machine 10 thus configured is mounted on a vehicle, and is installed in a passenger compartment 60. More specifically, the in-vehicle machine 10 is mounted on or accommodated in, for example, an instrument panel or the like in the passenger compartment 60. In the passenger compartment 60, for example, a driver seat 61, a front passenger seat 62, a rear A seat 63, a rear B seat 64, and the like are provided. Information on the number of these respective seats, the arrangement thereof, the mounting positions of the first microphone 30 and the second microphone 31, and the like are stored in advance in the storage unit 15 as vehicle information. Further, information on the angles of the respective seats, the heights of seating faces, and the like are appropriately acquired by the vehicle information acquisition unit 16, and are stored as vehicle information. This vehicle is also provided with an air conditioner (not shown), windows (not shown), and the like.

Now, the process of specifying an orientational direction at the time of the inputting of a speech sound, which is executed by the second speech sound extraction unit 19 in the early stages, in the in-vehicle machine 10 having the first microphone 30 and the second microphone 31 will be described with reference to FIGS. 3 to 5. For the sake of convenience, this process will, be referred to hereinafter as a beam forming method (BFM) process. Note that since a process for changing the orientational direction in the BFM process (e.g., a digital beam forming (DBF) process) is a well-known art, the detailed description, thereof will be omitted.

Figure 3:
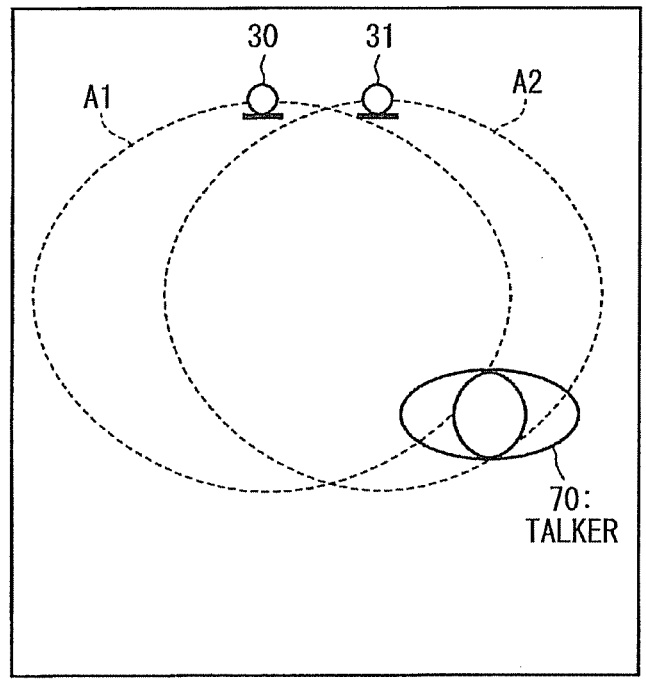
FIG. 3 is a first diagram showing an outline of a BFM process.
Figure 4:
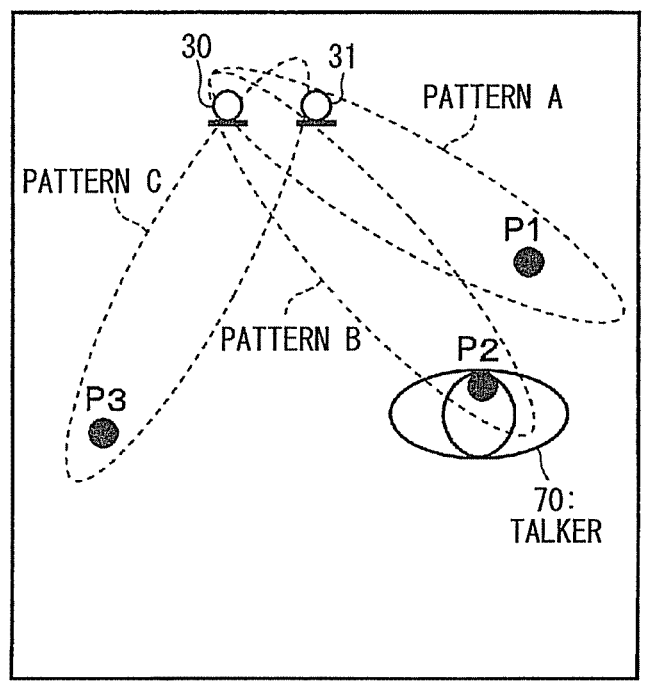
FIG. 4 is a second diagram showing the outline of the BFM process.

FIG. 3 schematically shows, in a plane view, a positional relationship among the first microphone 30, the second microphone 31, and a person 70 serving as a talker in the passenger compartment 60. The first microphone 30 and the second microphone 31 individually have orientational characteristics indicated by broken lines as a range A1 and a range A2, respectively, and speech sounds in the ranges A1 and A2 are input to the first microphone 30 and the second microphone 31, respectively. Note that the orientational characteristics of the first microphone 30 and the second microphone 31 have stereoscopic ranges that spread not only in the lateral direction shown in FIG. 3 but also in the vertical direction. The speech sounds input from the ranges A1 and A2 are subjected to the DBF process, whereby, the orientational directions formed by the first microphone 30: and the second microphone 31 change according to, for example, a pattern A, a pattern B, and a pattern C as shown in FIG. 4.

Figure 5A:
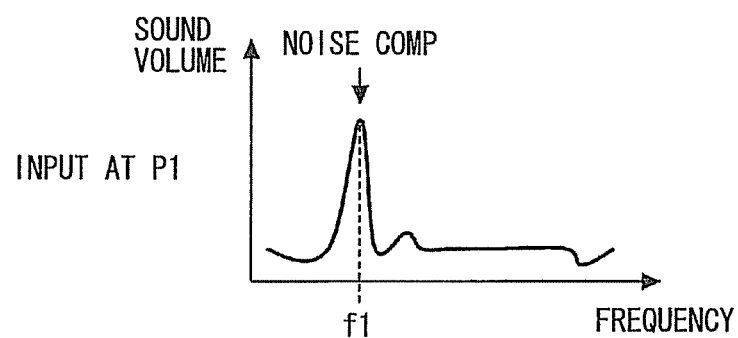
FIGS. 5A to 5C are third diagrams showing the outline of the BFM process.
Figure 5B:
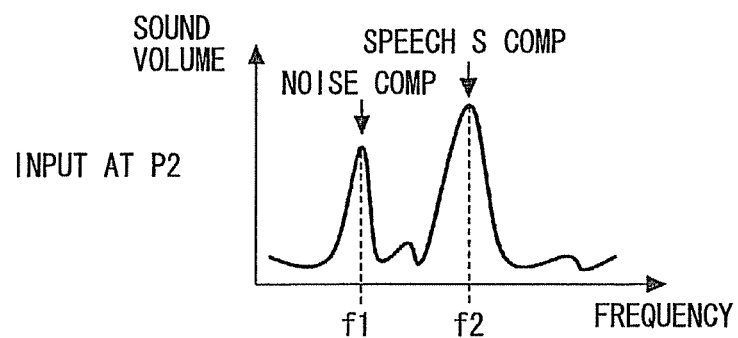
Figure 5C:
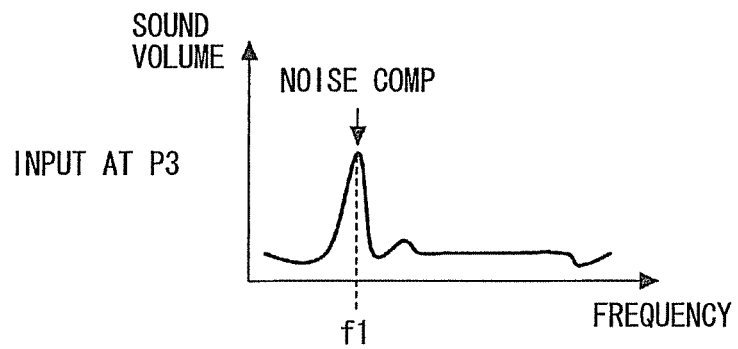

Here, it is assumed that an input signal from the orientational direction of the pattern A is in a state shown in FIG. 5A, an input signal from the orientational direction of the pattern B is in a state shown in FIG. 5B, and an input signal from the orientational direction of the pattern C is in a state shown in FIG. 5C. In this case, a speech sound is input from the orientational direction of the pattern B shown in FIG. 5B. Note that the speech sound recognition unit 20 determines that an input signal of a frequency f2 shown in FIG. 5B is a speech sound. When there is an input signal determined as a speech sound, the second speech sound extraction unit 19 specifies as the second orientational direction a direction in which the signal determined as a speech sound is locally maximum, while changing the orientational direction.

Incidentally, the BFM process is a process that is executed by the second speech sound extraction unit 19 in the early stages, but can also be executed by the first speech sound extraction unit 18 as will be described later. That is, the first speech sound extraction unit 18 and the second speech sound extraction unit 19 are different from each other in that one of them sets the orientational direction on the basis of vehicle information and the other sets the orientational direction on the basis of a result obtained from speech sound recognition, but both execute the DBF process, which is a substantial process for setting the orientational direction. Thus, since the speech sound recognition unit 20 is also connected to the first speech sound extraction unit 18 as shown in FIG. 1, the BFM process can be executed by the first speech sound extraction unit 18 as well in the present embodiment.

Next, the operation of the in-vehicle machine 10 configured as described above will be described.

Figure 7:
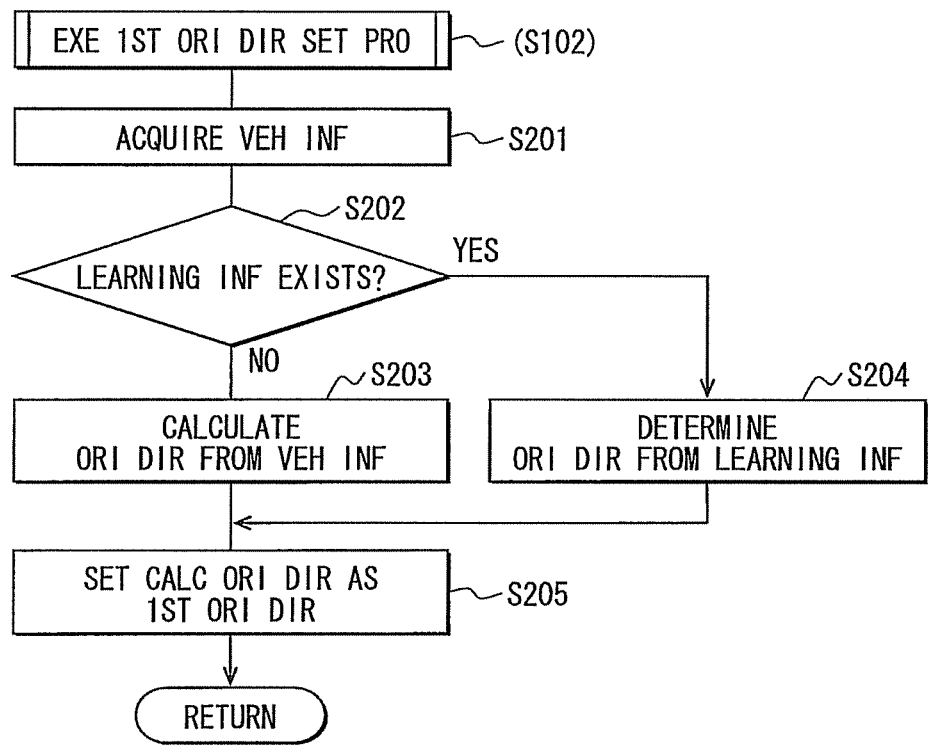
FIG. 7 is a diagram showing a flow of a first orientational direction setting process.
Figure 8:
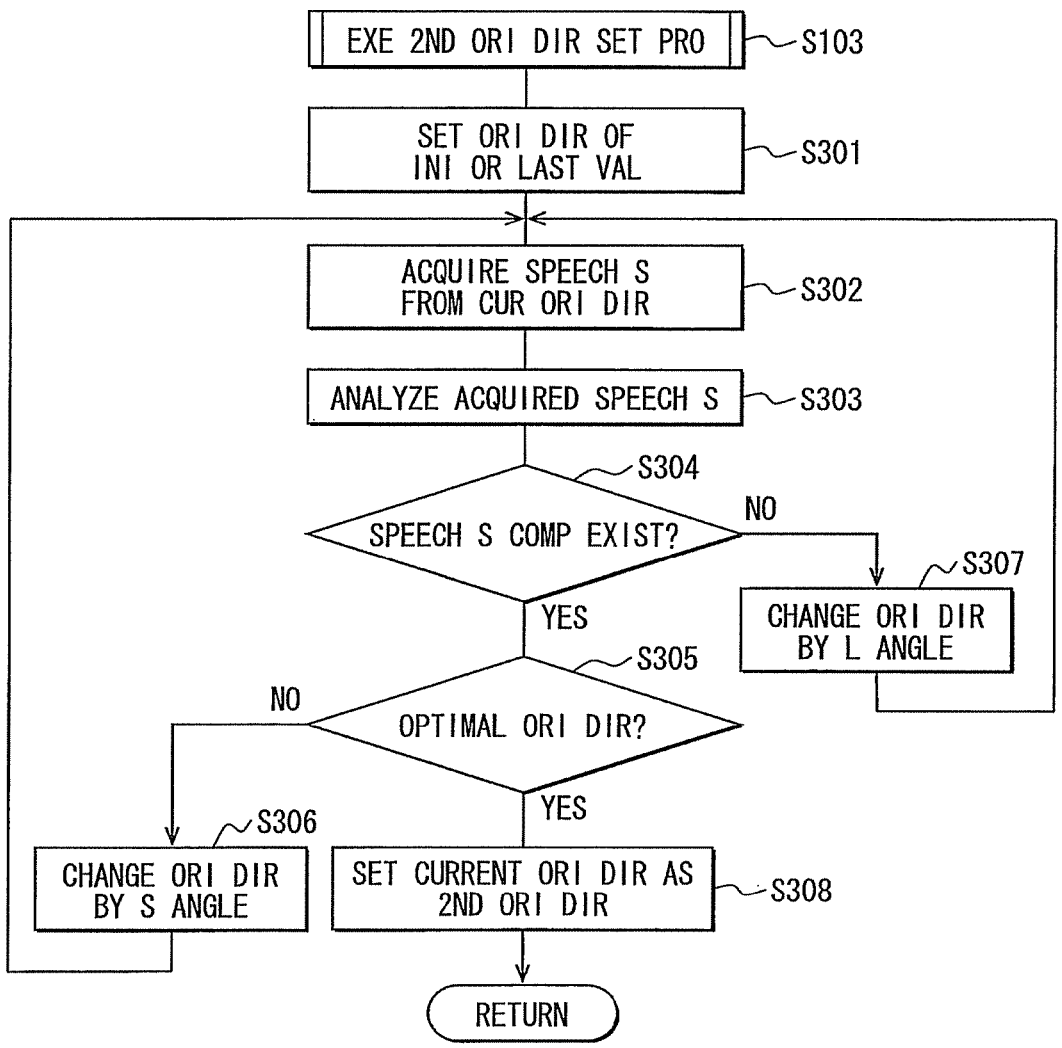
FIG. 8 is a diagram showing a flow of a second orientational direction setting process.
Figure 9:
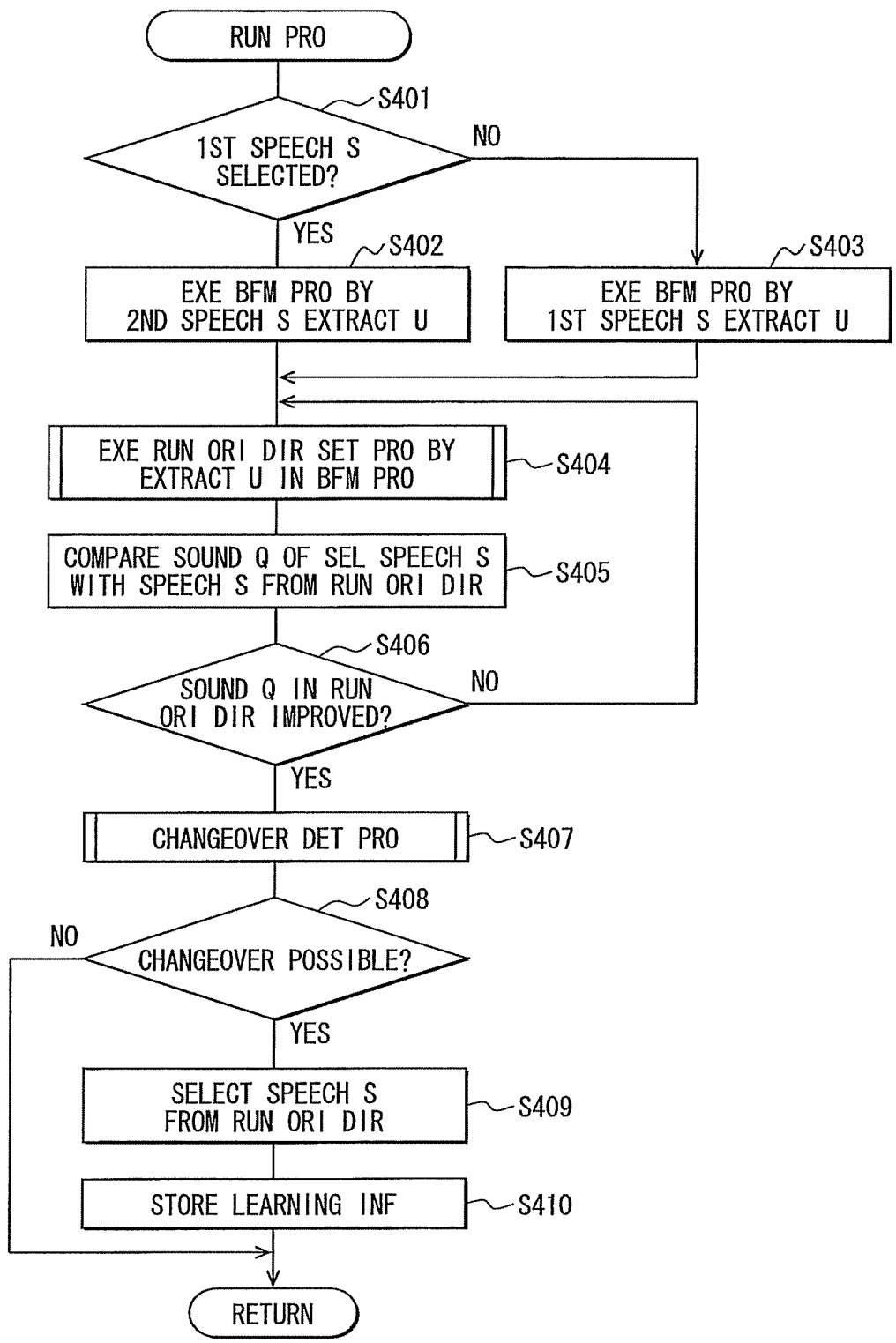
FIG. 9 is a diagram showing a flow of a running process.
Figure 10:
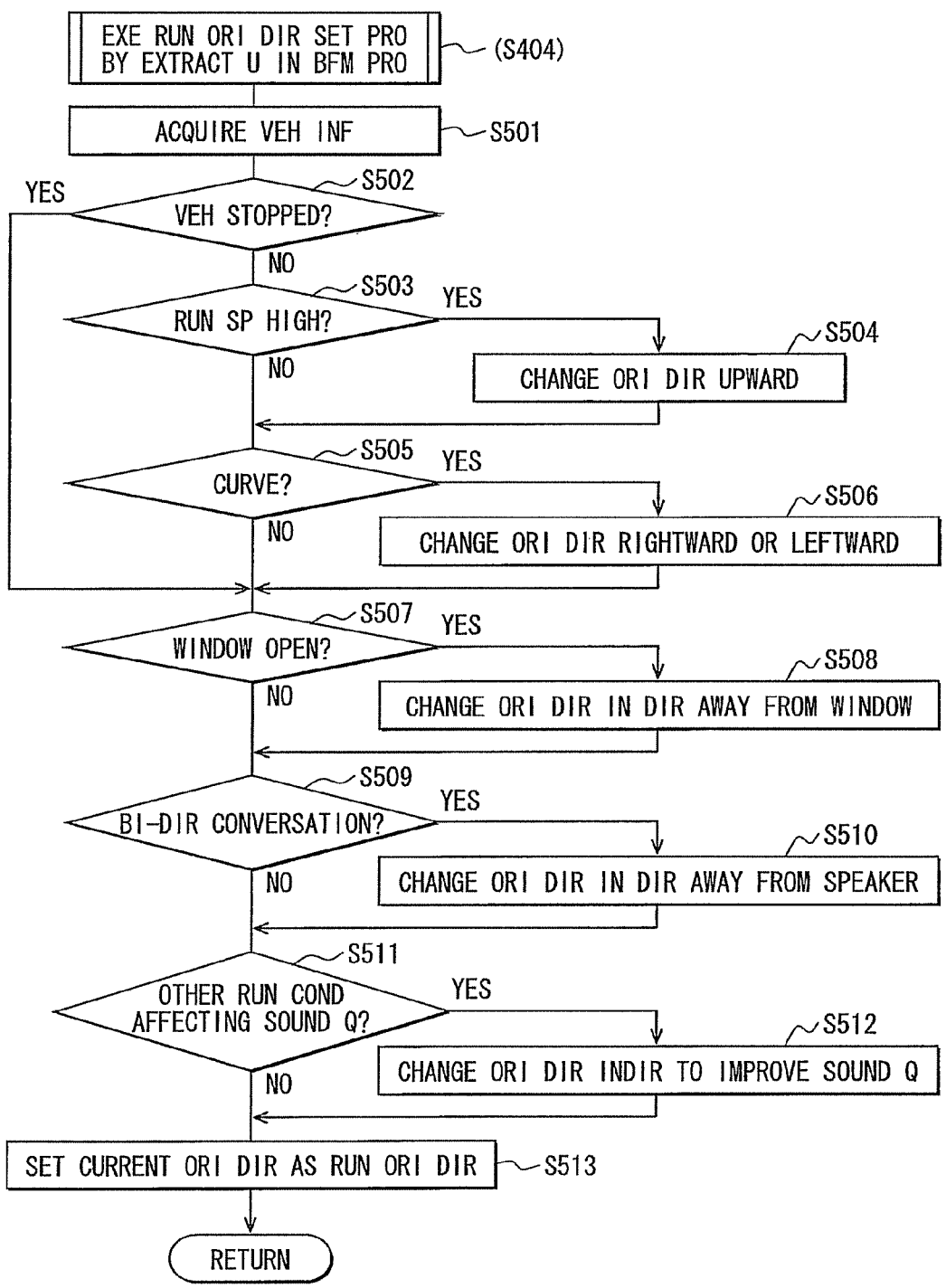
FIG. 10 is a diagram showing a flow of a running orientational direction setting process.
Figure 11:
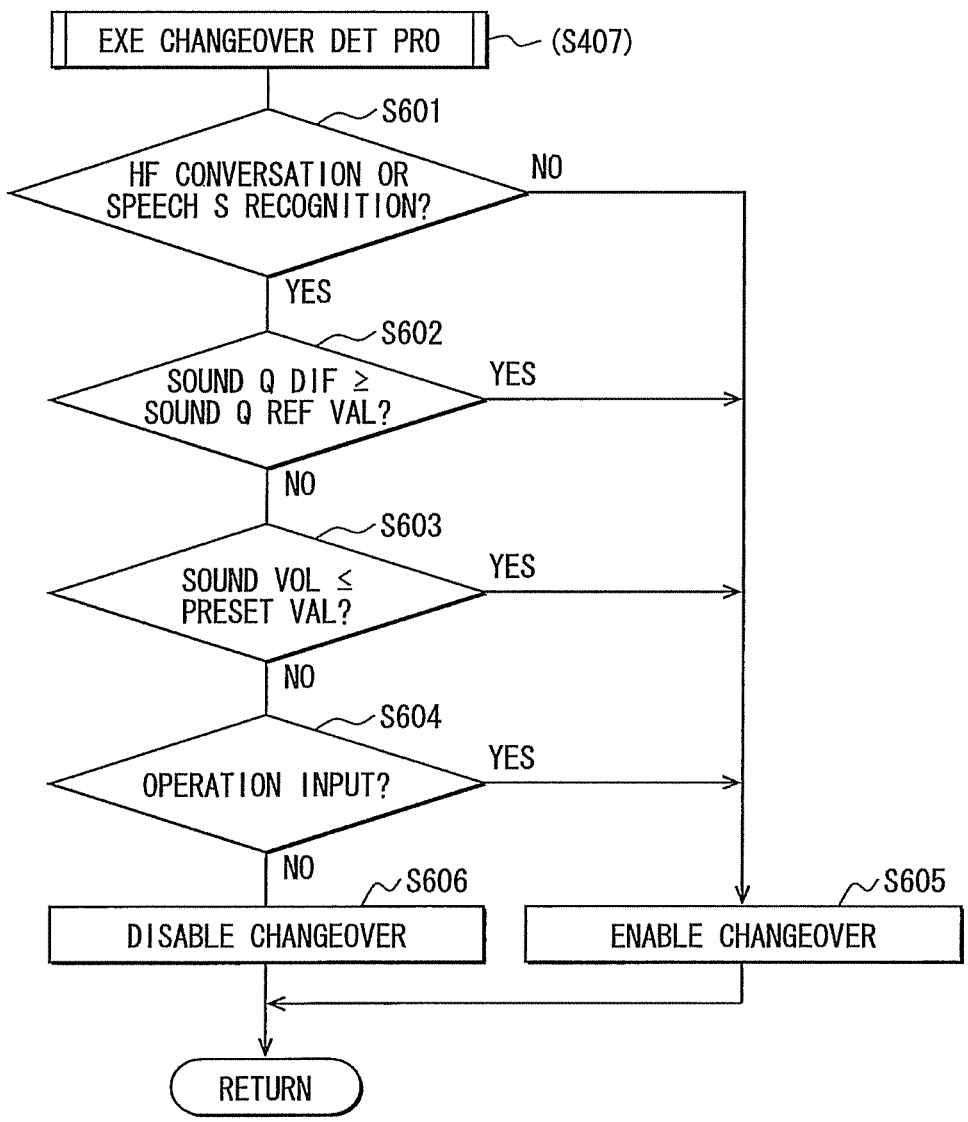
FIG. 11 is a diagram showing a flow of a changeover determination process.

The in-vehicle machine 10 executes a process for a navigation function and the like, and executes a startup process shown in FIG. 6, a first orientational direction setting process shown in FIG. 7, a second orientational direction setting process shown in FIG. 8, a running process shown in FIG. 9, a running orientational direction setting process shown in FIG. 10, and a changeover determination process shown in FIG. 11 with regard to the present disclosure. These processes are performed by the respective units (see FIG. 1) provided in the in-vehicle machine 10, but the description will be made using the in-vehicle machine 10 as a subject for the sake of simplicity.

In the startup process shown in FIG. 6, when the engine starts up (S101), the in-vehicle machine 10 executes the first orientational direction setting process in the first speech sound extraction unit 18 (S102). In the first orientational direction setting process, as shown in FIG. 7, vehicle information is first acquired (S201). In this case, the vehicle information is acquired from the sensors 27, the switches 28, the ECUs 29, and the like by the vehicle information acquisition unit 16. Then, it is determined whether or not there is learning information, namely, whether or not learning information is stored in the storage unit 15 (S202). Here, although described later in detail, the learning information includes vehicle information and information on the orientational direction in a state that has been determined, as optimal in the running process executed last time.

If there is no learning information (S202: NO), the in-vehicle machine 10 calculates an orientational direction from vehicle information stored in advance, in particular, vehicle information that are considered to affect the inputting of a speech sound, for example, the positions, heights, or angles of the seats (reclining states thereof), the tilt angles of the first microphone 30 and the second microphone 31 (the installation directions thereof), the types and arrangement of other control devices, and the like (S203). On the other hand, if there is learning information (S202: YES), the in-vehicle machine 10 decides an orientational direction from the learning information and the vehicle information (S204). Note that when learning information corresponding to a condition at the present moment is not stored in step S204, an orientational direction may be calculated from vehicle information.

Then, the in-vehicle machine 10 sets the orientational direction calculated in step S203 or S204 (S205) as the first orientational direction, and makes a return. This enables the first speech sound extraction unit 18 to extract a speech sound from the first orientational direction.

When a return is made from the first orientational direction setting process, the in-vehicle machine 10 executes a second orientational direction setting process equivalent to the BFM process using the second speech sound extraction unit 19, in the startup process shown in FIG. 6 (S103). In the second orientational direction setting process, as shown in FIG. 8, the in-vehicle machine 10 first sets an orientational direction of an initial value or a last value (S301). Here, the initial value is a predetermined orientational direction in executing the second orientational direction setting process, and the last value is an orientational direction specified last time, which is stored as learning information. In the present embodiment, the first orientational direction is set as the initial value. The first orientational direction is an orientational direction that is set on the basis of vehicle information or learning information as described above, in other words, an orientational direction in which a talker is highly likely to be present. Further, the last value is an orientational direction that is determined as an optimal orientational direction in the last process as will be described later, and hence, an orientational direction in which a talker is highly likely to be present and which is suited for inputting a speech sound; Thus, by setting the first orientational direction as the initial value or setting the last value, the BFM process can be executed from a direction in which a speech sound is highly likely to be input in the second speech sound extraction unit 19, so that the BFM process can be efficiently executed.

Subsequently, the in-vehicle machine 10 acquires a speech sound from, the current orientational direction a predetermined number of times (S302), analyzes the acquired speech sound (S303), and determines whether or not there is a speech sound component (S304). In this case, the speech sound recognition unit 20 analyzes the speech sound, and makes a determination on the speech sound component. Note that, the predetermined number of times may be changed depending on the sound volume, S/N ratio or the like of the input speech sound; If there is a speech sound component (S304: YES), it is determined whether or not the speech sound component is in the optimal orientational direction (S305). In this case, since it cannot be determined for the first time whether or not the speech sound component is optimal (S305: NO), the orientational direction is changed by a small angle (S306), and the processes starting from step S302 are repeated again. In the present embodiment, the small angle is assumed to be about 1°. This angle of about 1° is a value obtained on the assumption that the current orientational direction is directed toward the driver seat 61. For example, when the current orientational direction is directed toward the rear A seat 63 shown in FIG. 2, the distances from the first microphone 30 and the second microphone 31 are large, so that even a small change in angle may lead to a great change in the sound volume of the speech sound. For this reason, the in-vehicle machine 10 changes the angle by which the orientational direction is changed in accordance with the orientation of the current, orientational direction in step S306. Thus, a suitable angle can be set in accordance with the distances from the first microphone 30 and the second microphone 31.

The in-vehicle machine 10 repeats the process of step S306 in a scanning range that is so preset as to include the initial value or the last value. This is because the processing amount becomes excessively large if the entire range is scanned in the case of an orientational characteristic as shown in, for example, FIG. 2. That is, in the in-vehicle machine 10, an attempt to reduce the processing amount is also made by carrying out scanning from the neighborhood of the initial value or the last value. Note that the scanning range is set as angles in the lateral direction and the vertical direction that correspond to the position or the like of a target seat. When there is no speech sound input in that range, the scanning range may be enlarged.

On the other hand, upon determining that there is no speech sound component in step S304 (S304: NO), the in-vehicle machine 10 changes the orientational direction by a large angle, for example, about 10° (S307), and repeats the processes starting from step S302. That is, when there is no speech sound in the scanning range, the in-vehicle machine 10 enlarges the range, and repeatedly detects a speech sound. Note that in the case where there is no speech sound component (step S304: NO), when there is no speech sound component, namely, when a communication or a conversation is not under way even if a change in the orientational direction by a large angle (S307) is repeated a plurality of times, the initial value or last value set in step S301 is defined as the current orientational direction, although not shown in FIG. 8.

The in-vehicle machine 10 repeats a change in the orientational direction and a determination on optimality as described above. Upon determining that the orientational direction is optimal (S305: YES), the in-vehicle machine 10 sets the current orientational direction as the second orientational direction (S308), and makes a return. In this manner, the second speech sound extraction unit 19 can extract a speech sound from the second orientational direction.

Upon making a return from the second orientational direction setting process, the in-vehicle machine 10 compares the first speech sound and the second speech sound with each other in the startup process shown in FIG. 6 (S104). More specifically, the in-vehicle machine 10 compares the sound quality of the first speech sound output from the first speech sound extraction unit 18 with the sound quality of the second speech sound output from the second speech sound extraction unit 19 on the basis of the S/N ratio, the sound volume, or the like in the sound quality comparison unit 21. Then, if the speech sound is not improved in the second orientational direction, namely, if the first speech sound is higher in sound quality (S106: NO), the in-vehicle machine 10 selects the first speech sound as a transmitted speech sound (S106). At this time, the in-vehicle, machine 10 selects the first speech sound as a transmitted speech sound by changing over the changeover unit 22 to the first speech sound side, and ends the startup process. Note that even when there is no speech sound input from the second orientational direction and the comparison between the sound qualities cannot be made, the first speech sound is selected as a transmitted speech sound.

On the other hand, if the speech sound is improved in the second orientational direction (S105: YES), the in-vehicle machine 10 selects the second speech sound as a transmitted speech sound (S107), and ends the startup process. At this time, the in-vehicle machine 10 selects the second speech sound as a transmitted speech sound by changing over the changeover unit 22 to the second speech sound side. When the second speech sound is selected as a transmitted speech sound after a changeover to the second speech sound, the second speech sound extraction unit 19 stops the BFM process, and continues to extract a speech sound from the second orientational direction that has been determined as an optimal orientational direction. That is, the extraction unit on the side where the selected speech sound is output continues to extract a speech sound input from an orientational direction at the time of the selection, while maintaining this orientational direction. Note that since the startup process is a process that is executed in the early stages during the startup of the engine, the control of changeover has not been performed at this moment, but may be performed.

In this manner, the in-vehicle machine 10 compares the speech sound input from the first orientational direction with the speech sound input from the second orientational direction in the early stages of the startup of the engine, and selects the speech sound which is higher in sound quality as a transmitted speech sound. In this case, if the only purpose is to improve the sound quality during a hands-free conversation, there may be adopted a configuration in which it is determined whether or not a hands-free conversation is under way, and this startup process is executed when the hands-free conversation is under way. Further, as the startup process, there may be adopted a configuration in which only the initial setting of the orientational direction is carried out by executing, for example, the first orientational direction setting process of step S102. In the present embodiment, since the in-vehicle machine 10 also serves as a navigation system, the first orientational direction setting process and the second orientational direction setting process are executed in the startup process, also in the sense of improving the speech sound when a speech sound command is input.

Meanwhile, when there arises a necessity to make a phone call during the running of the vehicle, it is desirable to use a hands-free conversation function so as to ensure safety. On the other hand, events that affect the quality of a conversation speech sound, such as engine, noise, running noise (the sound of tires) and the like, occur during running.

Thus, the in-vehicle machine 10 attempts to improve the quality of a conversation speech sound as follows. A state where a hands-free conversation is carried out by a driver of the vehicle, namely, a state where a talker sits in the driver seat 61 and a speech sound is input will be assumed hereinafter. Note that the term "running process" shown in FIG. 9, which will be described hereinafter, is used for the sake of convenience in order to make a contrast with the aforementioned startup process shown in FIG. 6, and does not necessarily mean that the running process is executed only during running.

In the running process shown in FIG. 9, the in-vehicle machine 10 determines whether or not the first speech sound has been selected (S401). If the first speech sound has been selected (S401: YES), the second speech sound extraction unit 19 executes the aforementioned BFM process (S402). On the other hand, if the second speech sound has been selected (S401: NO), the first speech sound extraction unit 18 executes the aforementioned BFM process (S403). That is, the in-vehicle machine 10 executes the BFM process in one of the first speech sound extraction unit 18 and the second speech sound extraction unit 19 that has not output the speech sound that has been selected as a transmitted speech sound.

Then, the in-vehicle machine 10 executes the running orientational direction setting process by the extraction unit that executes the BFM process (the extraction unit on the side where a speech sound has not been selected) (S404). In the running orientational direction setting process, the in-vehicle machine 10 first acquires vehicle information as shown in FIG. 10 (S501). In this step S501, similar to step S201, the vehicle information acquisition unit 16 acquires vehicle information from the sensors 27, the switches 28, the ECUs 29, and the like. Then, the orientational direction is changed as follows, on the basis of the acquired vehicle information. For example, the in-vehicle machine 10 determines, on the basis of a vehicle speed acquired from the vehicle speed sensor, whether or not the vehicle is stopped (S502). If, the vehicle is not stopped (S502: NO), the in-vehicle machine 10 determines whether or not the running speed is high (S503), whether or not the vehicle runs along a curve (S505), and the like.

For example, when the vehicle speed is high on an expressway or the like, the running noise generated from the tires is considered to be loud. Thus, upon determining that the running speed is high (S503: YES), the in-vehicle machine 10 shifts the current orientational direction slightly upward in order to suppress the influence of running noise (S504).

Further, upon determining, on the basis of vehicle information acquired from the map data, the gyro sensor or the like, that the vehicle runs along a curve (S505: YES), the in-vehicle machine 10 changes the current orientational direction leftward (or rightward) on the assumption that the body of the driver moves or inclines slightly leftward (or rightward) (S506). Note that the right-and-left direction mentioned herein is equivalent to the lateral direction in the vehicle of FIG. 2.

Further, if it is determined, on the basis of vehicle information, that the window on the driver seat 61 side (which is assumed to be provided to the right of the driver seat 61 of FIG. 2) is open (S507: YES), the orientational direction is changed to a direction away from the window (leftward in the case of FIG. 2) in order to suppress the influence of wind noise.

Further, if a bidirectional conversation is under way, more strictly, if a speech sound received from a party on the other end of the line, is output from the speaker 33 (S509: YES), the in-vehicle machine 10 changes the orientational direction to a direction away from the speaker 33 (S510), in order to prevent the output speech sound from traveling in a roundabout manner.

Further, upon determining, on the basis of vehicle information, that there are other running conditions that affect the sound quality, for example, during the operation of the air conditioner with high intensity or the like (S511: YES), the in-vehicle machine 10 changes the orientational direction to such a direction as to improve the sound quality (S512).

On the basis of vehicle information as described above, such as running conditions, an intensity of the air conditioner, an open/closed state of the windows and the like, the in-vehicle machine 10 automatically performs control such that an optimal orientational direction, an optimal echo canceller characteristic, and an optimal noise canceller characteristic are obtained. Then, the in-vehicle machine 10 sets the changed orientational direction, namely, the current orientational direction as a running orientational direction (S513), and makes a return. Note that if the orientational direction is not changed, the original orientational direction at the time point when the running orientational direction setting process is started is set as a running orientational direction. Thus, on the basis of vehicle information or the like, the running orientational direction which is an optimal orientational direction during running is set.

Upon making a return, from the running orientational direction setting process, the in-vehicle machine 10 compares the selected speech sound with the speech sound input from the running orientational direction (S405) in the running process shown in FIG. 9. If the sound quality is not improved in the running orientational direction (S406: NO), the in-vehicle machine 10 makes a transition to step S404, and repeats the process.

On the other hand, if the sound quality is improved, in the running orientational direction (S406: YES), the in-vehicle machine 10 executes a changeover determination process of determining whether to make a changeover in speech sound or not (S407). For example, even under circumstances where the sound quality is improved by making a changeover to the running orientational direction, if a changeover in speech sound is made every time the orientational direction is changed, defects such as the instantaneous or intermittent generation of abnormal sound, the interruption of a conversation, and the like may be caused. Thus, the in-vehicle machine 10 of the present embodiment determines, on the basis of a plurality of determination conditions, whether or not a changeover can be made in the changeover determination process shown in FIG. 11, and allows the changeover unit 22 to make a changeover in speech sound when one of the plurality of the determination conditions is fulfilled. More specifically, the in-vehicle machine 10 determines that one of the determination conditions is fulfilled in the cases shown below, and permits the changeover.

Condition 1: the hands-free conversation function is not used, namely, a hands-free (HF) conversation is not under way (S601: NO). In this case, since an HF conversation is not under way, defect due to a changeover in speech sound does not occur.

Condition 2: the speech sound recognition unit 20 does not recognize any speech sound, namely, speech sound recognition is not under way (S601: NO). In this case, since a changeover in speech sound is made when the speech sound recognition unit does not recognize any speech sound, the rate of recognition can be prevented from decreasing. Note that in both the case where an HF conversation is under way and the case where an HF conversation is not under way, the condition 2 is included in the determination conditions.

Condition 3: a speech sound is recognized again while the speech sound recognition unit 20 is executing the speech sound recognition process, namely, speech sound recognition is not under way (S601: NO). In this case, the speech sound recognition process is temporarily suspended, and a changeover in speech sound is made when the speech sound is recognized again. Therefore, the rate of recognition can be prevented, from decreasing. Note that an HF conversation may or may not be under way.

Condition 4: a speech sound that is not selected as a transmitted speech sound is higher in sound quality than a speech sound that is selected as the transmitted speech sound by a value larger than a preset sound quality reference value (S602: YES). That is, the condition 4 is equivalent to a case where the unselected speech sound is higher in sound quality under circumstances where the sound quality of the selected speech sound is significantly low and affects the quality of a conversation. In this case, although, defects such as the interruption of a speech sound and the like may instantaneously occur during a changeover in speech sound, an advantage that is obtained by improving the sound quality through the changeover in speech sound is greater. As a result, the convenience can be enhanced. Note that the sound quality reference value is appropriately set on the basis of vehicle information, for example, the size of the passenger compartment 60 of the vehicle and the like.

Condition 5: a selected speech sound is equal to or smaller in sound volume than a prescribed value (a sound volume reference value), namely, a speech sound that is selected as a transmitted speech sound is smaller in sound volume than a preset sound volume reference value, and a speech sound that is not selected as the transmitted speech sound is larger in sound volume than the preset sound volume reference value (S603: YES). That is, the condition 5 is equivalent to, for example, a case where the unselected speech sound is larger in sound volume while the selected speech sound is significantly small in sound volume and affects the conversation quality, namely, a case where an advantage that is obtained by making a changeover in speech sound is greater as in the case with, the aforementioned condition 4. Note that the sound volume reference value is appropriately set on the basis of vehicle information such as the size of the passenger compartment 60 of the vehicle, the vehicle speed, and the like. For example, when the vehicle speed is high, the running noise is loud, and hence the sound volume reference value is increased.

Condition 6: a command to make a changeover in speech sound is input from the operation input unit 14 (S604: YES). In this case, the changeover in speech sound is naturally recognized by a talker. Therefore, there is no need to give as much consideration to the occurrence of defects as in the case where a changeover in speech sound is automatically made, and it is assumed that the convenience is not seriously affected.

Thus, in the case where, no defect occurs in making a changeover in speech sound, in the case where, even if defects occur, an advantage that is obtained through a changeover, in speech sound is greater, in the case where the occurrence of defects does not seriously affect the convenience, or the like, the in-vehicle machine 10 permits the changeover in speech sound, thereby controlling the operation of the changeover unit 22.

Now, the circumstances, where an operation of making a changeover in speech sound is input from the operation input unit 14 on the aforementioned condition 6 will be described. As shown in, for example, FIG. 12, the display unit 13 of the in-vehicle machine 10 displays a message M1 for selection of an orientational direction (which is referred to as a pattern in FIG. 12), seat marks M2, M3, M4, and M5 that schematically represent seats in the passenger compartment 60, a microphone mark M6, and supplementary information M7 for selecting orientational direction options and an orientational direction. The supplementary information M7 includes a pattern DF representing an orientational direction around the driver seat 61 with respect to the microphone mark M6, a pattern PF representing an orientational direction around the front passenger seat 62, a pattern PR representing an orientational direction around the rear A seat 63, and the like. The talker operates a touch panel or the like that is provided on the display unit 13, thereby inputting a command to select a desired orientational direction. Alternatively; as shown in FIG. 13, in addition to orientational directions (patterns DF1, DF2, and DF3), speech sound levels M8 (sound quality, sound volume, and the like) input from the respective orientational directions may be displayed as the supplementary information M7. Thus, it can be determined which one of the orientational directions is high in speech sound level, and the orientational direction can be easily selected.

Upon accepting an operation input, the in-vehicle machine 10 causes the first speech sound extraction unit 18 (or the second speech sound extraction unit 19) to extract a speech sound from the orientational direction thereof, and changes over the changeover unit 22. Thus, the orientational direction matching the desire of the talker can be set. In this case, since there is an operation input by the talker, the changeover in speech sound is naturally recognized by the talker. Thus, the necessity to consider the interruption of a conversation, the generation of abnormal sound and noise, and the like is less than that in the case where the changeover is automatically made on the conditions 1 to 5. Note that the interruption of a conversation, and the generation of abnormal sound and noise may be made unnoticeable by, for example, outputting an operation sound to make it clear that the changeover has been made.

Meanwhile, upon determining that one of the determination conditions is fulfilled, them-vehicle machine 10 determines that a changeover can be made (S605), and then makes a return from the changeover determination process. On the other hand, if none of the determination conditions is fulfilled (S601: YES, S602: NO, S603: NO, S604: NO), the in-vehicle machine 10 determines that a changeover cannot be made (S606), and makes a return from the changeover determination process.

Upon making a return from the changeover determination process, the in-vehicle machine 10 makes a transition to step S401 and repeats the processes starting from S401 again, if none of the determination conditions is fulfilled and a changeover cannot be made (S408: NO) in the running process shown in FIG. 9. That is, since a changeover in speech sound cannot be permitted at the moment, the in-vehicle machine 10 stands by while repeating the aforementioned processes until a permissible state is established. Note that the transition to step S401 is made while standing by, because the optimal running orientational direction may further change due to a change in running conditions.

On the other hand, if one of the determination conditions is fulfilled and a changeover can be made (S408: YES), the in-vehicle machine 10 selects a speech sound from the running orientational direction as a transmitted speech sound (S409). In this case, when the speech sound that is currently selected as a transmitted speech sound is the first speech sound, the in-vehicle machine 10 makes a changeover to the second speech sound that is output from the second speech sound extraction unit 19 that is executing the BFM process. When the speech sound that is currently selected is the second speech sound, the in-vehicle machine 10 makes a changeover to the first speech sound that is output from the first speech sound extraction unit 18 that is executing the BFM process. Thus, the transmitted speech sound is changed over, in accordance with the running conditions, to a speech sound that is higher in sound quality.

Then, the in-vehicle machine 10 associates the running orientational direction with the vehicle information at the time when the running orientational direction is set, and stores them into the storage unit 15 as learning information (S410). Thus, the running orientational direction that has been determined as an orientational direction in which the sound quality is further enhanced, and the vehicle information at the time when the running orientational direction is set are stored. In setting the orientational direction next time (step S202 shown in FIG. 7, and the like), the first orientational direction can be more appropriately set.

According to the vehicular apparatus described above, the following effects are achieved.

A speech sound input from the first orientational direction is extracted as the first speech sound in the first speech sound extraction unit 18. A speech sound input from the second orientational direction is extracted as the second speech sound in the second speech sound extraction unit 19. The first speech sound and the second speech sound are compared with each other in the sound quality comparison unit 21. On the basis of a result of the comparison, one of the first speech sound and the second speech sound which is higher in sound quality is selected as a transmitted speech sound in the changeover unit 22. Besides, when a predetermined determination condition is fulfilled, the control unit 11 allows the changeover unit 22 to make a changeover between the first speech sound and the second speech sound. That is, the in-vehicle machine 10 makes a changeover in speech sound when no defect occurs, or when defects are unlikely to occur. Thus, the occurrence of defects can be prevented, or the possibility of the occurrence of defects can be reduced during a changeover in speech sound.

In this case, the speech sound to which the changeover is made is a speech sound that is input from an orientational direction that is determined as an optimal orientational direction through the aforementioned first orientational direction setting process, the second orientational direction setting process, and the BFM process, more specifically, a speech sound that is automatically controlled in accordance with the running conditions, the intensity of the air conditioner, the open/closed state of the windows and the like so as to correspond to an optimal orientational direction, an optimal echo canceller characteristic, and an optimal noise canceller characteristic. This speech sound is higher in sound quality than the speech sound from which the changeover is made. Therefore, the quality of a conversation speech sound can also be enhanced.

In this case, as for a determination condition for permitting a changeover in speech sound, a changeover in speech sound is made, for example, in the case where no defect due to the changeover in speech sound occurs, or in the case where, even if the defects occur, an advantage that is obtained by making the changeover in speech sound is greater, as in the case with the aforementioned conditions 1 to 6. The convenience can thus be improved.

The BFM process, can be executed in the first speech sound extraction unit 18. When the second speech sound is selected, the BFM process is executed in the first extraction unit. Therefore, even when the second speech sound is selected, the optimal orientational direction can be specified by changing the orientational direction in the first speech sound extraction unit 18. It is always possible to specify the orientational direction corresponding to changes in running conditions, in other words, to set a more appropriate orientational direction while running in circumstances that change momentarily. As a result, the quality of the speech sound can be enhanced.

When a changeover to the first speech sound or the second speech sound is made, the orientational direction after the changeover is stored into the storage unit 15 as learning information. Thus, the first orientational direction can be set next time on the basis of the orientational direction that is determined as an optimal orientational direction. Consequently, the first orientational direction can be more promptly and more appropriately set. In this case, the orientational direction after the changeover in speech sound and the vehicle information at the time of the changeover in speech sound are associated with each other, and are stored as learning information. Thus, an appropriate orientational direction for the running conditions as well can also be set.

Further, when an operation for selecting an orientational direction is input from the operation input unit 14, the selected orientational direction is set as the first orientational direction. In general, the talker selects the orientational direction. Thus, by defining the orientational direction set by the talker as the first orientational direction, the direction in which the talker is present can be specified irrespective of vehicle information or the like. Further, it is conceivable that the talker is not sitting in the driver seat 61 in a vehicle. In such a case, a speech sound can also be appropriately input from a talker sitting in the front passenger seat 62, for example.

In this case, supplementary information on the orientational direction and the speech sound input from the orientational direction are displayed by the display unit 13. Therefore, the selection of the orientational direction and the like are possible on the basis of the supplementary information.

Further, the second speech sound extraction unit 19 executes the process for specifying the second orientational direction in the scanning range that is so preset as to include the first orientational direction. In the orientational characteristic as shown in FIG. 2, which is exhibited by the first microphone 30 and the second microphone 31, if the process of specifying the orientational direction is executed from the entire range thereof, the process may be executed for an unnecessary or insignificant direction. Thus, by executing the process of specifying the second orientational direction in the scanning range including the first orientational direction in which a talker is highly likely to be present, the possibility of execution of an unnecessary process can be reduced. In this case, the possibility of execution of an unnecessary process can be more reliably reduced by carrying out scanning from the orientational direction selected through an operation input by the talker.

Other Embodiments

The present disclosure is not limited to the embodiment described above, but can be modified or extended as follows.

Although the configuration that is provided with two microphones, namely, the first microphone 30 and the second microphone 31, has been illustrated, the number of microphones is not limited as long as two or more are provided.

When the pattern DF is selected in FIG. 12, details as shown in FIG. 13 may be subsequently displayed. Further, although the options in the lateral direction are displayed in FIGS. 12 and 13, orientational direction options in the vertical direction may be displayed.

Figure 12:
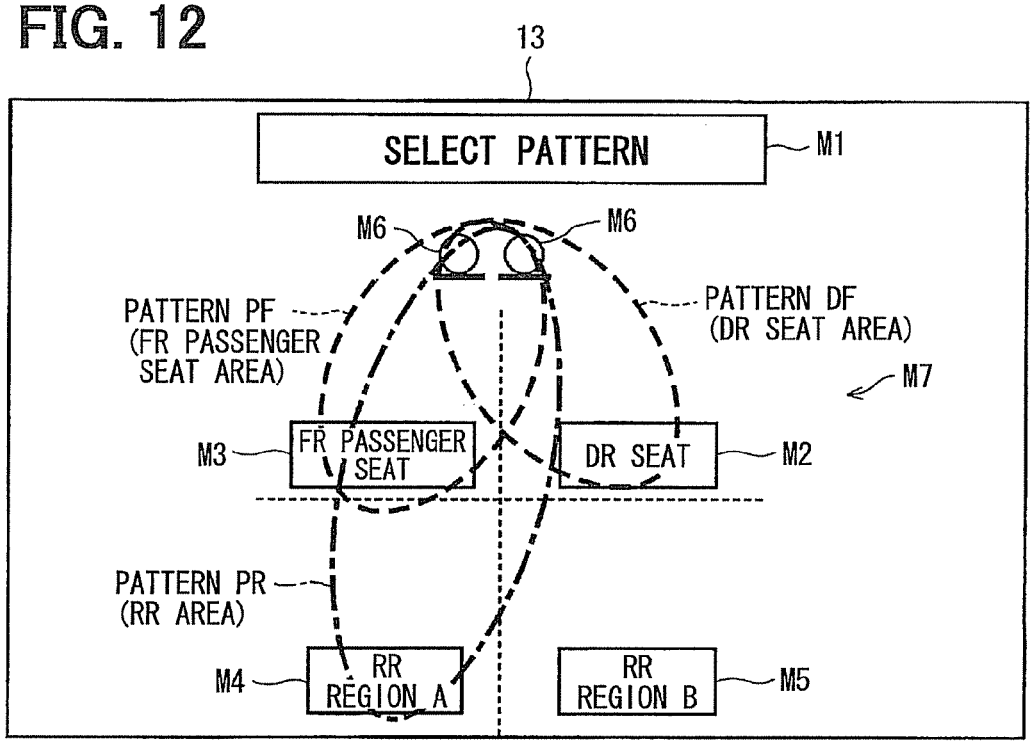
FIG. 12 is a first diagram schematically showing a display unit in setting an orientational direction through an operation input.
Figure 13:
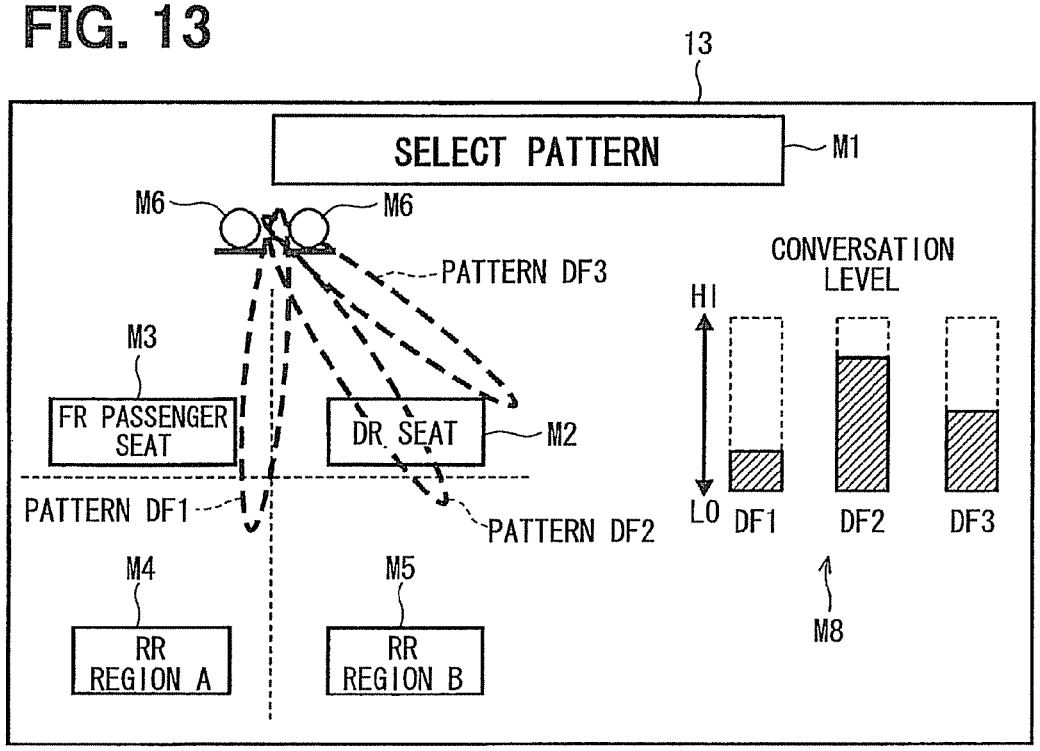
FIG. 13 is a second diagram schematically showing the display unit in setting an orientational direction through an operation input.

In setting the first orientational direction in the startup process shown in FIG. 6, the orientational direction options shown in FIGS. 12 and 13 or the like may be displayed, and the orientational direction selected by the talker may be selected as the first orientational direction. Thus, for example, even under circumstances where the talker sits in the front passenger seat 62, a speech sound can be appropriately input.

The supplementary information is displayed by the display unit 13 in order to set the orientational direction. However, information on the current orientational direction and a speech sound input from the orientational direction (e.g., the speech sound levels M8 of FIG. 13) may be displayed as supplementary information constantly or in response to the performance of a display operation by the talker.

The display mode in selecting the orientational direction as shown in each of FIGS. 12 and 13 is merely an example, and the present disclosure is not limited thereto. For example, only the arrangement of the seats may be displayed. In this case, the talker selects the position of his/her seat so that a general orientational direction is first set, and then, an appropriate orientational direction is set on the in-vehicle machine 10 side. This makes it possible to reduce the troublesomeness in setting the orientational direction.

The type of the communication terminal 40 may be specified, and information on the specified type of the communication terminal 40 may be stored as learning information or vehicle information. The communication terminal 40 is usually used by a single user (e.g., a talker), and it is assumed that a hands-free conversation using a mobile terminal of the user is also carried out by the same user. Thus, if specific information such as the phone number of the communication terminal 40, the Bluetooth address at the time of Bluetooth connection, and the like are associated with the information on the orientational direction at the time when the communication terminal 40 is used, and are stored as learning information, an appropriate orientational direction can be set if the same communication terminal 40 is used next time.

Although the conditions 1 to 6 are exemplified as the determination conditions to be fulfilled, the present disclosure is not limited thereto. Other conditions that do not affect or that are unlikely to affect the sound quality may be set as determination conditions.

Although the BFM process is executed by the first speech sound extraction unit 18, it is also appropriate to adopt a configuration that is provided with two second speech sound extraction units 19.

Although the in-vehicle machine 10 serves also as a car navigation system, an in-vehicle machine and a car navigation system may of course be provided individually.

The above disclosure has the following aspects.

According to an aspect of the present disclosure, a vehicular, apparatus having a hands-free conversation function for coupling with a communication terminal, which is connectable to a public line network, the vehicular apparatus includes: a communication device for communicating with the communication terminal; a speech sound output device for outputting a received speech sound, which is received from the communication terminal via the communication device; a speech sound input device having a first microphone and a second microphone, for inputting a transmission speech sound that is to be transmitted to the communication terminal; a vehicle information acquisition device for acquiring vehicle information that relates to a vehicle, on which the speech sound input device is mounted; a first speech sound extraction device for setting a first orientational direction, which provides a directionality of the speech sound input device, according to the vehicle information acquired by the vehicle information acquisition device, and for extracting a first speech sound that is input from the first orientational direction; a speech sound recognition device for signal-processing the transmission speech sound input via the speech sound input device so as to recognize the transmission speech sound; a second speech sound extraction device for signal-processing the transmission speech sound input via the speech sound input device, for specifying a second orientational direction, which provides an input direction of the transmission speech sound recognized by the speech sound recognition device, based on a signal processing result with changing the directionality of the speech sound input device, and for extracting a second speech sound that is input from the second orientational direction; a sound quality comparison unit for comparing a sound quality of the first speech sound with a sound quality of the second speech sound; a changeover device for selecting one of the first speech sound and the second speech sound, which is higher in sound quality, according to a comparison result provided by the sound quality comparison unit, and for performing a changeover between the first speech sound and the second speech sound to select the one of the first speech sound and the second speech sound as the transmission speed sound; and a control device for allowing the changeover device to perform the changeover between the first speech sound and the second speech sound when a predetermined determination condition is fulfilled.

In the above apparatus, when a changeover is made between speech sounds that are subjected to different processes, for example, in the case where a hands-free conversation is under way, defects such as the interruption of a transmission speech sound transmitted to a party on the other end of, the line, the generation of abnormal sound, and the like may be caused. Thus, the possibility of the occurrence of defects during a changeover in speech sound can be reduced by specifying a direction in which a speech sound that is higher in sound quality is input while changing the orientational direction, and controlling the changeover, between the speech sounds on the basis of fulfillment of the determination condition. Besides, the speech sound to which the changeover is made is a speech sound determined as an optimal speech sound by the second speech sound extraction device, in other words, a speech sound that is higher in sound quality than the speech sound from which the changeover is made. Therefore, the quality of the speech sound of conversation can be enhanced as well.

Alternatively, the control device may determine that the determination condition is fulfilled when the vehicular apparatus does not utilize the hands-free conversation function. In this case, a changeover in speech sound is made when a hands-free conversation function is not used. Thus, because a conversation is not under way, the possibility of the occurrence of defects resulting from a changeover in speech sound can be reduced.

Alternatively, the control device may determine that the determination condition is fulfilled when the speech sound recognition device does not execute to recognize the transmission speech sound. In this case, a changeover in speech sound is made when a speech sound selected as a transmitted speech sound is not recognized by speech sound recognition device. Therefore, the rate of recognition can be prevented from decreasing.

Alternatively, the control device may determine that the determination condition, is fulfilled when the speech sound recognition device restarts to execute to recognize the transmission speech sound after the speech sound recognition device temporarily suspends executing to recognize the transmission speech sound. In this case, a changeover in speech sound is made when the speech sound selected as a transmission speech sound is recognized again while the speech sound recognition device recognizes the speech sound. As a result, the rate of recognition can be prevented from decreasing.

Alternatively, the control device may determine that the determination condition is fulfilled when the sound quality comparison unit provides the comparison result such that the difference between the sound quality of a selected one of the first speech sound and the second speech sound as the transmission speed sound and the sound quality of a not-selected one of the first speech sound and the second speech sound is higher than a predetermined sound quality reference value. In this case, a changeover in speech sound is made when the speech sound that is not selected as a transmission speech sound is higher in sound quality than the speech sound that is selected as the transmission speech sound by a value larger than a preset sound quality reference value. Thus, even if defects such as the interruption of a speech sound and the like occur, an advantage that is obtained by making a changeover in speech sound to enhance the sound quality is considered to be greaten Thus, by making a changeover in speech sound when the difference in sound quality has exceeded the sound quality reference value, the convenience can be enhanced as a result.

Alternatively, the control device may determine that the determination condition is fulfilled when a sound volume of a selected one of the first speech sound and the second speech sound as the transmission speed sound is smaller than a predetermined sound volume reference value, and when a sound volume of a not-selected one of the first speech sound and the second speech sound is larger than the predetermined sound volume reference value. In this case, a changeover in speech sound is made when the speech sound that is selected as a transmission speech sound is smaller in sound volume than a preset sound volume reference value, and the speech sound that is not selected as the transmission, speech sound is larger in sound volume than the preset sound volume reference value. This can also enhance the convenience.

Alternatively, the first speech sound extraction device may be configured to execute a process of signal-processing the transmission speech sound input from the speech sound input device so as to change the directionality of the speech sound input device. When the changeover device selects the second speech sound as the transmission speech sound, the first speech sound extraction device executes the process of signal-processing the transmission speech sound input from the speech sound input device, the first speech sound extraction device specifies the first orientational direction, which provides the input direction of the transmission speech sound recognized by the speech sound recognition device, based on a signal processing result with changing the directionality of the speech sound input device, and the first speech sound extraction device extracts the first speech sound that is input from the first orientational direction. When the changeover device selects the second speech sound as the transmission speech sound, the second speech sound extraction device stops executing to change the directionality of the speech sound input device, and the second speech sound extraction device extracts the second speech sound that is input from an orientational direction set prior to a stoppage of changing the directionality. In this case, the first speech sound extraction device is configured to be able to execute a process of subjecting to a signal process a speech sound input to the speech sound input device and changing the orientational direction at the time of the inputting of the speech sound, and executes the process when the second speech sound is selected as a transmission speech sound by the changeover device. When the second speech sound is selected, the second speech sound extraction device continues to extract the speech sound input from the second orientational direction. At this time, depending on the running condition, the optimal orientational direction may change. Thus, by changing the orientational direction to specify the optimal orientational direction in the first speech sound extraction device when the second speech sound is selected, the process of specifying an orientational direction corresponding to changes in running conditions, in other words, the process of specifying a more appropriate orientational direction can be continuously executed, and the quality of the speech sound can be enhanced.

Alternatively, the second speech sound extraction device may specify the second orientational direction with changing the directionality of the speech sound input device within a predetermined scanning range, which includes the first orientational direction. In this case, the second speech sound extraction device executes a process for specifying the second orientational direction in a scanning range that is so preset as to include the first orientational direction. Each of a first microphone and a second microphone has an orientational characteristic. In general, the orientational characteristic is so formed as to spread in a space in front of each of the microphones. In that case, when the process of specifying the second orientational direction is executed from the entire range, the process may be executed for an unnecessary or insignificant direction. Thus, by executing the process of specifying the second orientational direction in the scanning range that includes the first orientational direction set on the basis of vehicle information, namely, the first orientational direction in which a talker is highly likely to be present, the possibility of execution of an unnecessary process can be reduced.

Alternatively, the vehicular apparatus may further include: a storage device for storing learning information when the changeover device performs the changeover between the first speech sound and the second speech sound. The learning information provides a selected one of the first speech sound and the second speech sound. The first speech sound extraction device sets the first orientational direction according to the learning information when the learning information is stored in the storage device. In this case, when a changeover to the first speech sound or the second speech sound is made by the changeover device, the orientational direction after the changeover is stored as learning information. Thus, the first orientational direction can be set next time on the basis of the orientational direction determined as an optimal orientational direction. As a result, the first orientational direction can be set more swiftly.

Alternatively, the vehicular apparatus may further include: an operation input device for inputting an operation for selecting an orientational direction. The first speech sound extraction device sets a selected orientational direction as the first orientational direction when the operation for selecting the orientational direction is input from the operation input device. In this case, operation input device for inputting an operation for selecting an orientational direction is further provided. When an operation for selecting an orientational direction is input from the operation input device, the first speech sound extraction device sets the selected orientational direction as the first orientational direction. By thus allowing a talker to set an orientational direction, a speech sound can be appropriately input from, for example, a talker sitting in a front passenger seat as well, in a vehicle in which there may be no talker sitting in a driver seat.

Alternatively, the vehicular apparatus may further include: a display device for displaying supplementary information, which provides a selected orientational direction and a speech sound that is input from the selected orientational direction. In this case, supplementary information, for example, the quality of a current speech sound, options in selecting an orientational direction from the operation input device, and the like can be displayed. Therefore, it is possible to carry out the selection of the orientational direction based on the supplementary information and the like.

Alternatively, the storage device may store the learning information, which provides a relationship between a selected orientational direction after the changeover device performs the changeover between the first speech sound and the second speech sound, and the vehicle information when the changeover device performs the changeover between the first speech sound and the second speech sound. In this case, the orientational direction after a changeover, in speech sound and vehicle information upon the changeover in speech sound are associated with each other to be stored as learning information. Thus, an appropriate orientational direction that also corresponds to the running condition can be set.

Alternatively, the control device may determine that the determination condition is fulfilled when an operation for performing the changeover between the first speech sound and the second speech sound is input from the operation input device. In this case, a changeover in speech sound is made when a command to make a changeover in speech sound is input from later-described operation input device. Thus, a talker naturally recognizes that, the changeover in speech sound is made. Therefore, the influence of the occurrence of defects is reduced in comparison with a case where a changeover in speech sound is automatically made.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicular apparatus having a hands-free conversation function for coupling with a communication terminal, which is connectable to a public line network, the vehicular apparatus comprising:
    a communication device for communicating with the communication terminal;
    a speech sound output device for outputting a received speech sound, which is received from the communication terminal via the communication device;
    a speech sound input device having at least a first microphone and a second microphone, for inputting a transmission speech sound that is to be transmitted to the communication terminal;
    a vehicle information acquisition device for acquiring vehicle information that relates to a vehicle, on which the speech sound input device is mounted;
    a first speech sound extraction device for setting a first orientational direction, which provides a directionality of the speech sound input device, according to the vehicle information acquired by the vehicle information acquisition device, and for extracting a first speech sound that is input from the first orientational direction;
    a speech sound recognition device for signal-processing the transmission speech sound input via the speech sound input device so as to recognize the transmission speech sound;
    a second speech sound extraction device for signal-processing the transmission speech sound input via the speech sound input device, for specifying a second orientational direction, which provides an input direction of the transmission speech sound recognized by the speech sound recognition device, based on a signal processing result while changing the directionality of the speech sound input device, and for extracting a second speech sound that is input from the second orientational direction;
    a sound quality comparison unit for comparing a sound quality of the first speech sound extracted from the first speech sound extraction device with a sound quality of the second speech sound extracted from the second speech sound extraction device;
    a changeover device for selecting one of the first speech sound and the second speech sound, which is higher in sound quality, according to the comparison result between the sound quality of the first speech sound and the sound quality of the second speech sound provided by the sound quality comparison unit, and for setting the transmission speech sound to the selected one of the first speech sound and the second speech sound; and
    a control device for allowing the changeover device to perform the setting of the transmission speech sound to the selected one of the first speech sound and the second speech sound when a predetermined determination condition is fulfilled.

2. The vehicular apparatus according to claim 1,
    wherein the control device determines that the determination condition is fulfilled when the vehicular apparatus does not utilize the hands-free conversation function.

3. The vehicular apparatus according to claim 1,
    wherein the control device determines that the determination condition is fulfilled when the speech sound recognition device does not recognize the transmission speech sound.

4. The vehicular apparatus according to claim 1,
    wherein the control device determines that the determination condition is fulfilled when the speech sound recognition device restarts to recognize the transmission speech sound after the speech sound recognition device temporarily suspends executing to recognize the transmission speech sound.

5. The vehicular apparatus according to claim 1,
    wherein the control device determines that the determination condition is fulfilled when the sound quality comparison unit provides the comparison result such that a difference between the sound quality of the selected one of the first speech sound and the second speech sound set as the transmission speech sound and the sound quality of a not-selected one of the first speech sound and the second speech sound is higher than a predetermined sound quality reference value.

6. The vehicular apparatus according to claim 1,
    wherein the control device determines that the determination condition is fulfilled when a sound volume of the selected one of the first speech sound and the second speech sound set as the transmission speech sound is smaller than a predetermined sound volume reference value, and when a sound volume of a not-selected one of the first speech sound and the second speech sound is larger than the predetermined sound volume reference value.

7. The vehicular apparatus according to claim 1,
    wherein the first speech sound extraction device is configured to execute a process of signal-processing the transmission speech sound input from the speech sound input device so as to change the directionality of the speech sound input device,
    wherein, when the changeover device sets the second speech sound as the transmission speech sound, the first speech sound extraction device executes the process of signal-processing the transmission speech sound input from the speech sound input device, the first speech sound extraction device specifies the first orientational direction, which provides the input direction of the transmission speech sound recognized by the speech sound recognition device, based on a signal processing result while changing the directionality of the speech sound input device, and the first speech sound extraction device extracts the first speech sound that is input from the first orientational direction, and wherein, when the changeover device sets the second speech sound as the transmission speech sound, the second speech sound extraction device stops executing to change the directionality of the speech sound input device, and the second speech sound extraction device extracts the second speech sound that is input from an orientational direction set prior to a stoppage of the changing the directionality.

8. The vehicular apparatus according to claim 1, wherein the second speech sound extraction device executes a process for specifying the second orientational direction within a predetermined scanning range, which includes the first orientational direction.

9. The vehicular apparatus according to claim 1, further comprising:
a storage device for storing learning information, which provides an orientational direction of a selected one of the first speech sound and the second speech sound after the changeover, when the changeover device performs the setting of the transmission speech sound, and
wherein the first speech sound extraction device sets the first orientational direction according to the learning information when the learning information is stored in the storage device.

10. The vehicular apparatus according to claim 1, further comprising:
an operation input device for inputting an operation for selecting a selected orientational direction,
wherein the first speech sound extraction device sets the selected orientational direction as the first orientational direction when the operation for selecting the orientational direction is input from the operation input device.

11. The vehicular apparatus according to claim 1, further comprising:
a display device for displaying supplementary information, which provides a selected orientational direction and a speech sound that is input from the selected orientational direction.

12. The vehicular apparatus according to claim 9, wherein the storage device stores the learning information, which provides a relationship between a selected orientational direction after the changeover device sets the transmission speech sound, and the vehicle information when the changeover device sets the transmission speech sound.

13. The vehicular apparatus according to claim 10, wherein the control device determines that the determination condition is fulfilled when an operation for setting the transmission speech sound is input from the operation input device.

* * * * *